United States Patent [19]
Miller et al.

[11] Patent Number: 5,819,619
[45] Date of Patent: Oct. 13, 1998

[54] DUST COLLECTION SYSTEM FOR COMPOUND MITER SAW

[75] Inventors: Philip Miller, Lutherville; Daryl S. Meredith, Hampstead; Michael L. O'Banion, Westminster, all of Md.

[73] Assignee: Black & Decker Inc., Newark, Del.

[21] Appl. No.: 600,907

[22] Filed: Feb. 13, 1996

Related U.S. Application Data

[63] Continuation of Ser. No. 329,766, Oct. 27, 1994, abandoned, which is a continuation of Ser. No. 88,266, Jul. 7, 1993, abandoned, which is a continuation of Ser. No. 774,767, Oct. 9, 1991, abandoned, and a continuation-in-part of Ser. No. 744,022, Oct. 9, 1991, Pat. No. 5,297,463, Mar. 29, 1994.

[51] Int. Cl.⁶ ................................ B26D 7/18; B27B 5/20
[52] U.S. Cl. ...................... 83/100; 83/468.7; 83/471.3; 83/581
[58] Field of Search ................ 83/100, 391, 393, 83/397, 468.3, 468.7, 471.3, 478, 490, 481, 471.2

[56] References Cited

U.S. PATENT DOCUMENTS

| | | | |
|---|---|---|---|
| D. 282,346 | 1/1986 | Pioch | D8/66 |
| D. 295,823 | 5/1988 | Brickner, Jr. et al. | D15/133 |
| D. 305,542 | 1/1990 | Miyamoto et al. | D15/133 |
| D. 306,031 | 2/1990 | Ushiwata et al. | D15/133 |
| D. 331,416 | 12/1992 | Fushiya et al. | D15/133 |
| D. 336,652 | 6/1993 | Arehart | D15/133 |
| 922,840 | 5/1909 | Bemiller | 83/100 |
| 1,476,196 | 12/1923 | Dobyne | 51/273 |
| 1,552,553 | 9/1925 | Georgiaza | 144/252 R |
| 1,830,151 | 11/1931 | Wilderson | 83/162 |
| 1,888,679 | 11/1932 | Knapp | 83/440.2 |
| 3,322,169 | 5/1967 | Hilliard | 83/100 |
| 3,339,597 | 9/1967 | Kohler | 83/166 |
| 3,401,724 | 9/1968 | Kreitz | 83/471.3 |
| 3,585,980 | 6/1971 | Mellor | 125/13.01 |
| 3,998,121 | 12/1976 | Bennett | 83/471.3 |
| 4,028,975 | 6/1977 | Bennett | 83/397 |
| 4,063,478 | 12/1977 | Stuy | 83/478 X |
| 4,144,781 | 3/1979 | Kreitz | 83/100 |
| 4,150,598 | 4/1979 | Berends et al. | 83/478 |
| 4,201,256 | 5/1980 | Truhan | 83/100 X |
| 4,241,505 | 12/1980 | Bodycomb, Jr. et al. | 83/100 X |
| 4,253,362 | 3/1981 | Olson | 83/100 |
| 4,255,995 | 3/1981 | Connor | 83/100 |
| 4,300,426 | 11/1981 | Weaver | 83/100 X |
| 4,367,665 | 1/1983 | Terpstra et al. | 83/100 |
| 4,517,869 | 5/1985 | Kuhlmann et al. | 83/100 |
| 4,576,072 | 3/1986 | Terpstra et al. | 83/100 X |
| 4,694,720 | 9/1987 | Brickner, Jr. et al. | 83/471.3 |
| 4,694,721 | 9/1987 | Brickner, Jr. | 83/471.3 |

(List continued on next page.)

FOREIGN PATENT DOCUMENTS

| | | |
|---|---|---|
| 0048331 | 8/1981 | European Pat. Off. . |
| 0055896 | 11/1981 | European Pat. Off. . |
| 2350245 | 4/1975 | Germany . |
| 2459440 | 8/1976 | Germany . |
| 3136590 | 3/1983 | Germany . |
| 8815327 | 5/1989 | Germany . |
| 1133993 | 10/1979 | Italy . |
| 1315720 | 5/1973 | United Kingdom . |
| 1468096 | 3/1977 | United Kingdom . |
| 1499692 | 2/1978 | United Kingdom . |

*Primary Examiner*—Clark F. Dexter
*Attorney, Agent, or Firm*—Harness, Dickey & Pierce, P.L.C.

[57] ABSTRACT

A dust or chip collection and diversion system is provided for a device having a cutting tool for performing a working operation on a workpiece. The position and orientation of the dust-receiving or dust-collecting opening remains constant with respect to the cutting tool regardless of the position or configuration of the device, the device having a movable blade or other cutting tool, thus greatly enhancing the dust collection effectiveness in any of a number of operational configurations. Such position and orientation of the dust-receiving opening is also independent of the movement or position of any adjustable or movable guard or workpiece-supporting fence.

22 Claims, 5 Drawing Sheets

U.S. PATENT DOCUMENTS

| | | | |
|---|---|---|---|
| 4,721,023 | 1/1988 | Bartlett et al. | 83/100 |
| 4,794,740 | 1/1989 | Keith et al. | 51/273 |
| 4,799,416 | 1/1989 | Kumasaka et al. | 83/473.3 X |
| 4,869,142 | 9/1989 | Sato et al. | 83/467.1 |
| 4,934,233 | 6/1990 | Brundage et al. | 83/581 X |
| 5,038,650 | 8/1991 | Hodge | 83/471.3 |
| 5,084,972 | 2/1992 | Waugh | 83/100 X |
| 5,421,228 | 6/1995 | Fukinuki | 83/471.3 |

DUST COLLECTION SYSTEM FOR COMPOUND MITER SAW

This is a continuation of U.S. patent application Ser. No. 08/329,766, filed Oct. 27, 1994, entitled DUST COLLECTION SYSTEM FOR COMPOUND MITER SAW, now abandoned, which is a continuation of pending application Ser. No. 08/088,266, filed Jul. 7, 1993, entitled DUST COLLECTION SYSTEM FOR COMPOUND MITER SAW, now abandoned, which is a continuation of application Ser. No. 07/774,767, filed Oct. 9, 1991 entitled DUST COLLECTION SYSTEM FOR COMPOUND MITER SAW, now abandoned.

This is a continuation-in-part of U.S. patent application, Ser. No. 07/744,022, filed Oct. 9, 1991, now issued as U.S. Pat. No. 5,297,463, on Mar. 29, 1994.

BACKGROUND AND SUMMARY OF THE INVENTION

The present invention relates generally to dust or chip collection systems for saws or other power operated equipment or machinery. More particularly, the invention relates to such dust or chip collection systems with the dust collector being disposed on a movable portion of the saw or other such equipment in order to maintain proper dust-collecting alignment with a movable saw blade or other work-performing device while performing various operations on a workpiece.

Saws and other apparatuses designed for cutting or performing other working operations on a workpiece frequently require a saw blade, cutter, or other such work-performing device that is movable to a number of different positions or orientations for performing various operations. Examples of such equipment include compound miter saws, which allow the user to selectively move the saw blade into any of a number of positions or modes for square cutting, for miter cutting, for bevel cutting, or for compound cutting where a combination miter and bevel are cut. In addition, some operations, such as shaping or dado cutting operations, for example, require the use of saw blades or other cutting devices of different shapes or sizes to be substituted for one another in order to perform the desired operation on the workpiece, whether the workpiece is composed of wood, plastic, metal, or other materials. In most examples of such equipment, it is highly desirable to provide a dust collection system for diverting dust and chips away from the user.

In order to accommodate these widely varied working operations, dust collection ducts, or openings are frequently disposed on an adjustable guard so as to be at least partially adjustable for various operations, or on a fence in order to accommodate the varied positions or orientations of the blade or other cutter. If such dust collector adjustability, by way of adjustment of the guard, were not provided, a substantial loss of dust-collecting effectiveness would result, or a very large dust collection opening would have to be provided in order to accommodate the widely varying range of movement, position, or size of the saw blade, cutter, or other working device. Such collection ducts or openings on guards or fences have been found to be relatively ineffective in many of their adjusted positions, and such large collection openings have been found to be cumbersome and disadvantageous because of the space occupied by them.

In an attempt to address the above-discussed problems, a variety of other dust collection arrangements have previously been provided. However, many of such prior arrangements have suffered the same or other disadvantages, including difficulty in maintaining proper alignment between the dust collection duct or opening and the saw blade or other cutter, inconvenience and interference when performing operations on large or odd-shaped workpieces, the possibility of inadvertently misplacing separate dust collection components, lack of adequate dust collection, or other similar short-comings. Thus, the need has arisen for a dust collection system for compound miter saws, or other power equipment with movable or adjustable blades or cutters, which overcomes these disadvantages, as well as providing greater dust-collection effectiveness, improved ease of operation, economy in manufacturing, and other advantages that will become readily apparent to those skilled in the art from the discussion below.

In accordance with the present invention, an improved dust collection system for a saw or other device having a movable blade or cutting tool is provided. The dust collection system is spaced away from the saw blade or other cutting tool, is separate from any blade or cutter guard, and includes a dust-receiving opening that is at a fixed location relative to the movable blade or cutting tool and movable therewith. Preferably, the dust-receiving opening has an orientation relative to the blade or cutting tool that is aligned with a line that extends between the opening and the blade or cutting tool, with such line extending along a tangent to the rotation of the blade or cutting tool, and with such tangent preferably being at a location on the blade or cutting tool that engages the workpiece when the blade or cutting tool is moved to a workpiece-engaging position. Such dust collection opening orientation thus remains essentially constant during movement of the blade or cutting tool and is independent of any adjustment of the guard.

In preferred embodiments of the present invention for compound miter saws, for example, the dust-receiving opening is disposed at the open end of a dust duct that is interconnected with a pivot mechanism that is adapted for pivotally moving the saw blade into and out of engagement with a workpiece and for pivotally moving the saw blade among various cutting configurations. Such preferred dust duct is pivotally movable with a pivot arm and is preferably disposed in a bifurcated portion of the pivot arm in a space between a pair of spaced-apart legs. The dust duct is adapted for conveying dust or chips away from the saw and the user and can be connected in dust-conveying communication with a dust collection receptacle, either with or without powered dust extraction or dust-conveying vacuum equipment.

Additional objects, advantages, and features of the present invention will become apparent from the following description and the appended claims, taken in conjunction with the accompanying drawings.

DETAILED DESCRIPTION OF THE PREFERRED EMBODIMENTS

Figure 1:
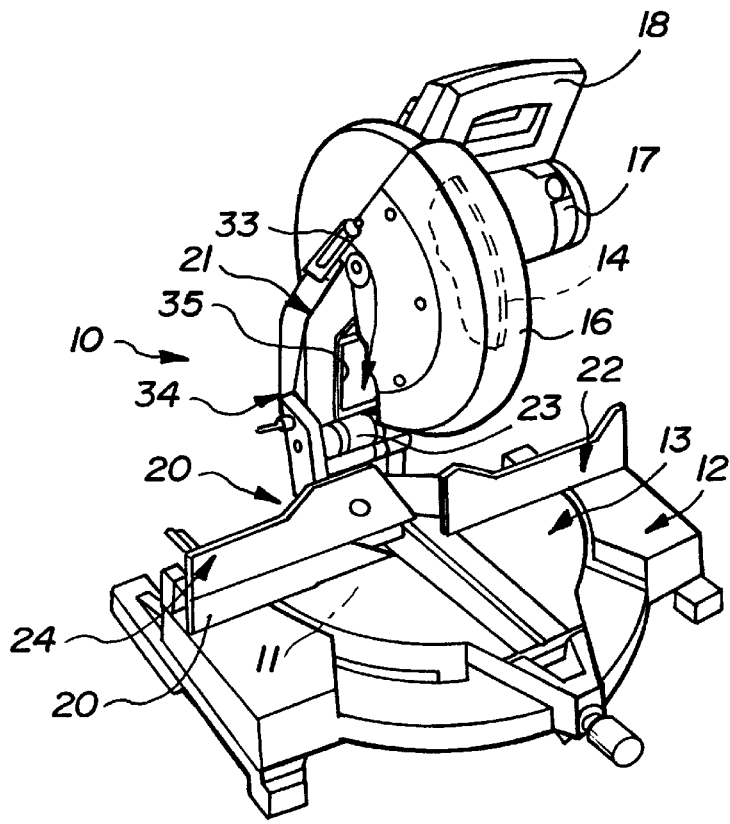
FIG. 1 is a front perspective view of an exemplary compound miter saw featuring a dust collection system according to the present invention.
Figure 2:
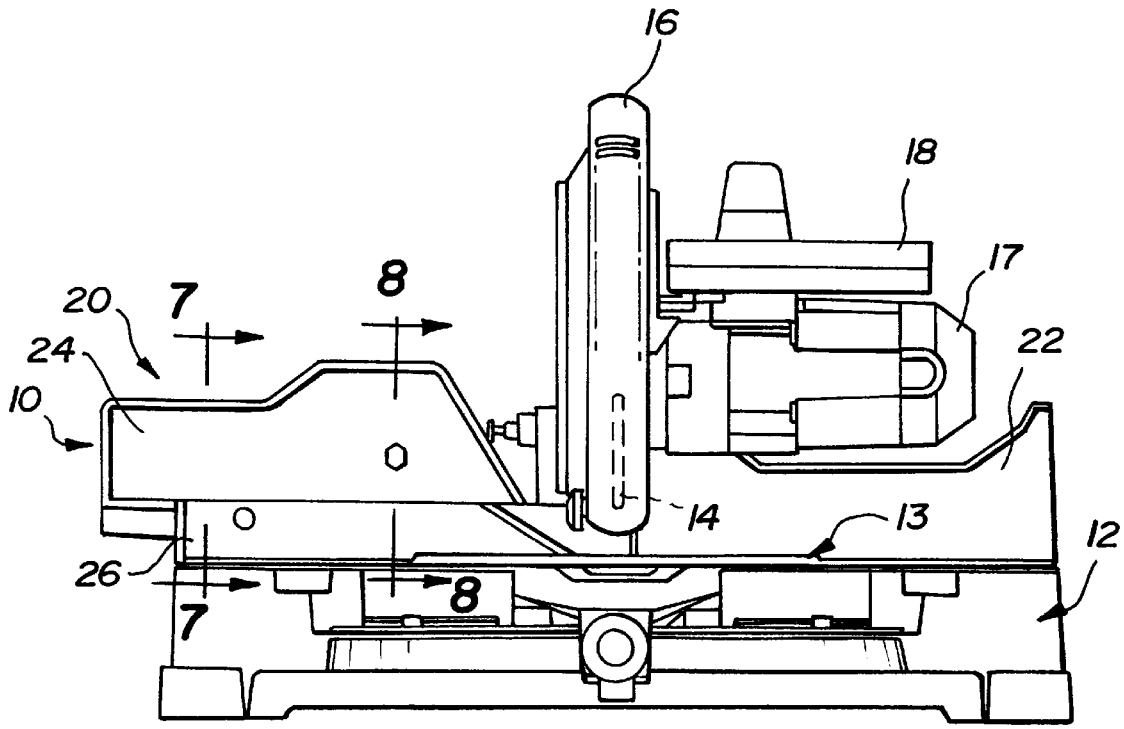
FIG. 2 is a front elevational view of the compound miter saw of FIG. 1.
Figure 3:
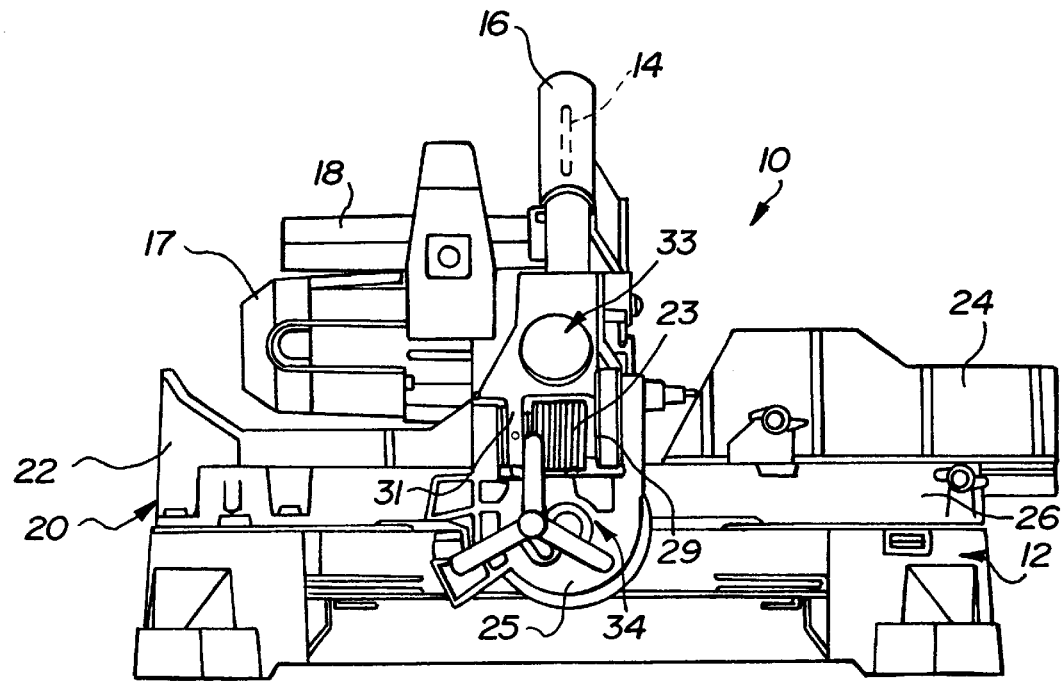
FIG. 3 is a rear elevational view of the compound miter saw of FIGS. 1 and 2.

FIGS. 1 through 10 illustrate an exemplary compound miter saw having a dust collection system according to the present invention, shown merely for purposes of illustration. One skilled in the art will readily recognize from the following description, taken in conjunction with the accompanying drawings and claims, that the principles of the invention are equally applicable to compound miter saws or other saws of types other than that shown for purposes of illustration in the drawings. Similarly, one skilled in the art will readily recognize that the principles of a dust collection system according to the invention are also applicable to other types of powered, or even unpowered, equipment for performing an operation on a workpiece. Such other types of equipment include so-called "chop" saws, dado saws, spindle shapers, spindle sanders, or other types of powered or unpowered devices that require movable blades or cutters in order to perform various different workpiece working operations.

Referring primarily to FIGS. 1 through 4, an exemplary compound miter saw 10 typically has a base assembly 12, including a table assembly 13, which is preferably rotatable in order to accommodate the various cutting modes discussed below. The saw 10 also includes a saw blade 14, at least partially enclosed by a blade guard 16 and driven by a motor 17, and a handle 18, which allows the operator to move the saw blade 14 and the blade guard 16 from a clear position free of a workpiece 11 (FIG. 4) to a cutting position with the saw blade 14 in cutting engagement with the workpiece 11.

As is conventional in this type of equipment, a fence assembly, indicated generally by reference numeral 20, is interconnected with the base assembly 12 and extends laterally across the table assembly 13, against which the workpiece 11 is positioned and supported for performing a cutting operation thereon. The illustrated fence assembly 20 includes a fixed fence portion 22 on one side of the blade 14, and a movable fence portion 24 slidably movable on a fixed fence-supporting portion 26 on the opposite side of the blade 14 (as shown in FIGS. 1 through 4), with the fixed and movable fence portions 22 and 24, respectively, and the fence-supporting portion 26, extending in a mutually aligned lateral direction to define a workpiece abutment surface, and with the movable fence portion 24 being laterally spaced away from the fixed fence portion 22. Such lateral spacing or gap between the fixed and movable fence portions 22 and 24, respectively, provides clearance for the saw blade to perform a cutting operation completely through the workpiece 11, regardless of the mode or type of cutting operation being performed. As is discussed in more detail below, the movable fence portion 24 is laterally movable toward and away from the fixed fence portion 22 in order to allow the operator to selectively adjust the clearance gap therebetween and thus accommodate the particular cutting operation being performed.

As is typical in this type of equipment, the compound miter saw 10 depicted in the drawings is capable of a number of different cutting modes or positions. Such positions include those for straightcross-cutting operations, straight miter-cutting operations, bevel cutting operations, and various combinations of bevel cutting and miter cutting, commonly called compound cutting operations, with the adjustable fence assembly 20 being adjustable to provide the minimum required clearance gap between the fixed and movable fence portions 22 and 24, respectively, in any of these cutting modes.

These various cutting operations or working modes, or combinations thereof, are accomplished by way of a compound pivot mechanism 34, including a pivot arm assembly 21, which is pivotally interconnected with the rotatable table assembly 13. The pivot arm assembly 21 includes a trunnion-type pivot mechanism 23, as shown in FIGS. 1, 3 through 5, and 8, providing for pivotal movement of the saw blade 14 into and out of engagement with the workpiece 11, and a pivot mechanism 25 providing for pivotal movement of the saw blade 14 among a number of square or bevel cutting configurations. Lateral swinging movement is accomplished by way of the above-mentioned table assembly 13, which is disposed for rotation relative to the base assembly 12, thus accommodating movement among the various cutting configurations.

The pivot arm assembly 21, at least in part as a result of the above-mentioned structure of the trunnion-type pivot 23, includes a bifurcated lower and rearward end configuration, with this portion of the pivot arm assembly 21 being split to form a pair of pivot legs 29 and 31 with a space therebetween for receiving a dust duct 33 therebetween. The dust duct 33 has a centerline 33a, and further has a preferably rectangular-shaped dust-receiving opening 35 at its forward end, a transitional intermediate portion 37, and a preferably circular outlet opening 39, to which any of a number of suitable dust-conveying fittings 47, or other accessories, can be attached.

Figure 4:
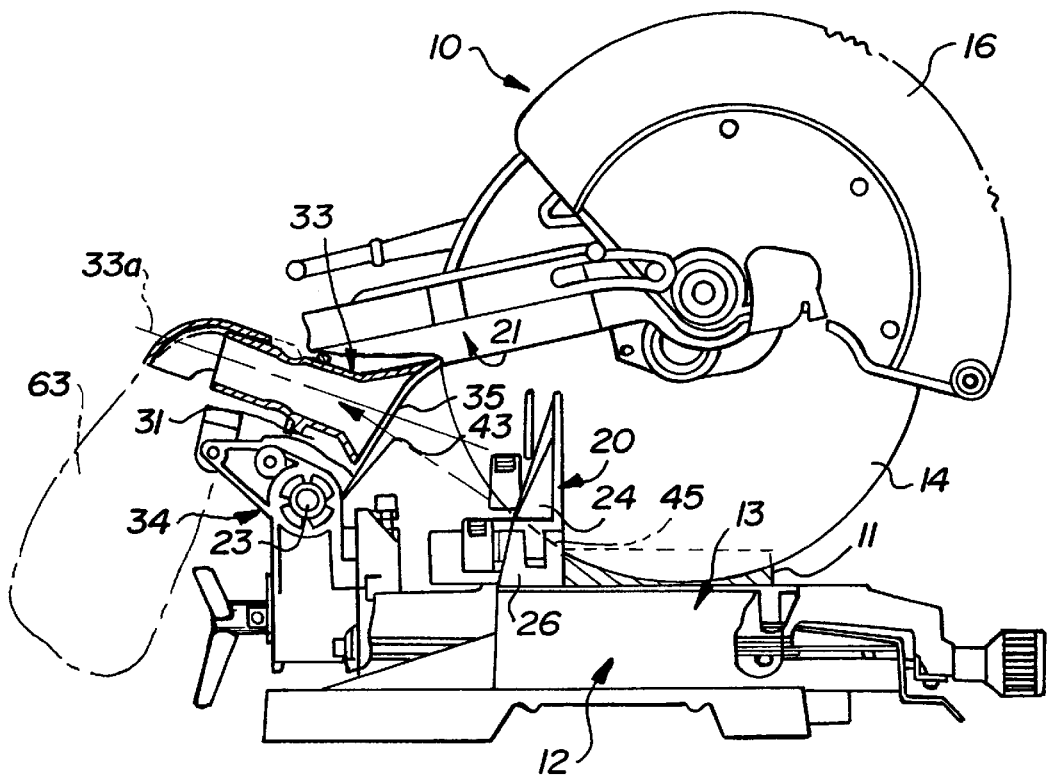
FIG. 4 is a left end elevational view of the compound miter saw of FIGS. 1 through 3, with portions cut away to illustrate the dust-receiving duct of the present invention.
Figure 5:
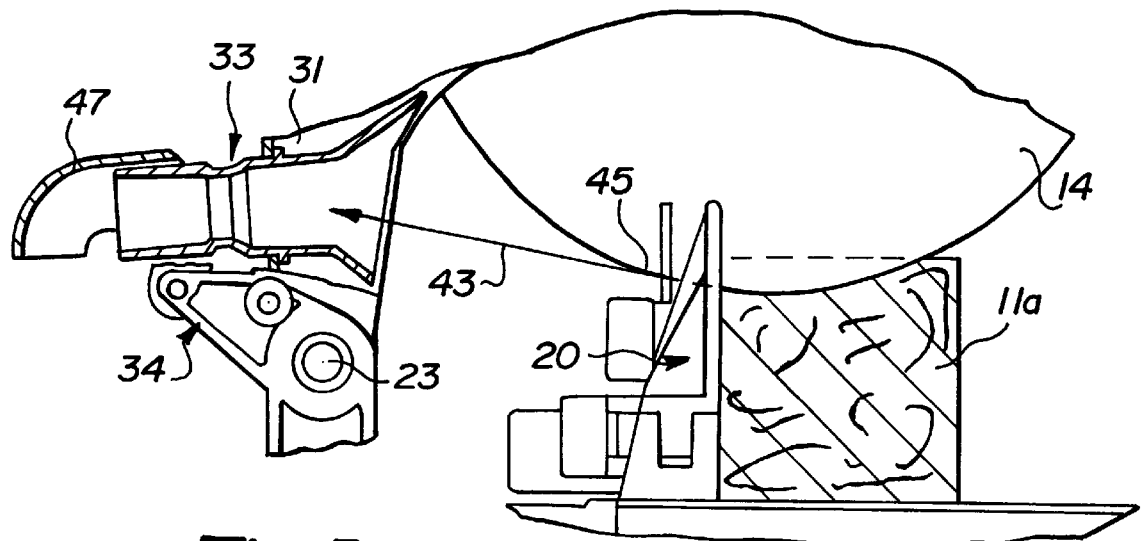
FIG. 5 is a schematic elevational view, diagrammatically illustrating the exemplary compound miter saw in use for cutting a relatively thick workpiece.
Figure 6:
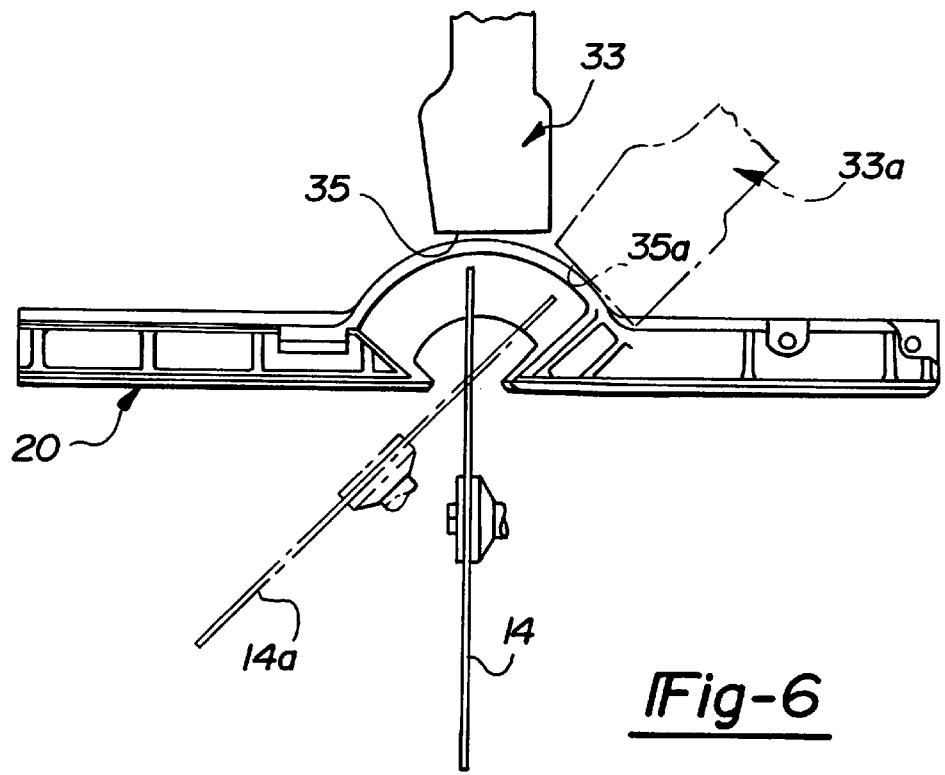
FIG. 6 is a schematic top plan view, diagrammatically illustrating the exemplary compound miter saw in use for performing a miter-cutting operation.
Figure 7:
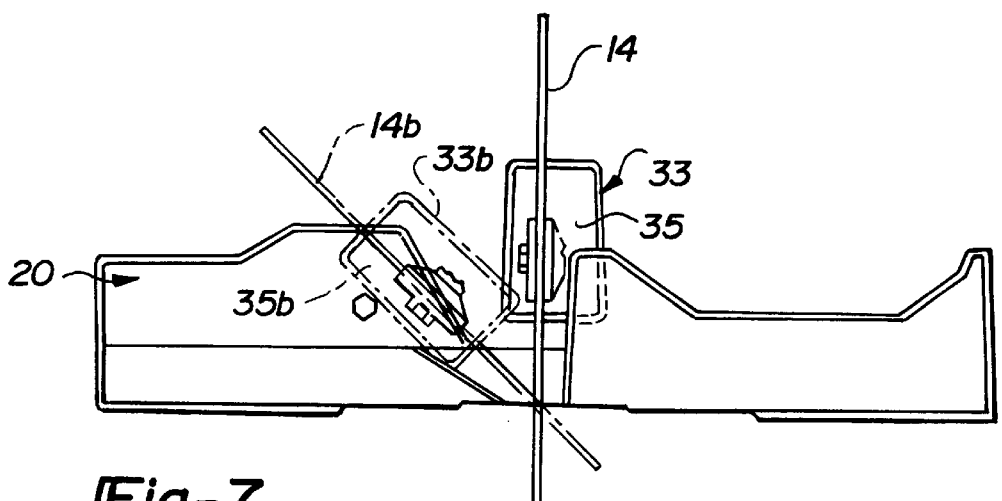
FIG. 7 is a schematic elevational view, similar to that of FIG. 6, but diagrammatically illustrating a bevel-cutting operation.

As is shown in the end elevation view of FIG. 4, as well as schematically, or diagrammatically, represented in FIGS. 5 through 7, the dust duct 33 pivotally moves with the pivot arm assembly 21 and/or the rotatable table assembly 13, and thus with the saw blade 14, into and out of engagement with the workpiece 11 (or even a workpiece 11a of different size or shape) in any of the square cross-cutting, bevel-cutting, miter-cutting, or compound miter-cutting operations of which the compound miter saw 10 is capable. However, because the dust duct 33 is fixedly interconnected with the pivot arm assembly 21, its position and orientation relative to the saw blade 14 remains constant during any of these operational modes or configurations, thus contributing greatly to the consistency and effectiveness of the dust collection system in the compound miter saw 10, or in other devices having movable work-performing tools.

Preferably, as shown in FIGS. 4 and 5, the constant position and orientation of the dust duct 33 is such that the dust-receiving opening 35 is aligned substantially along a line 43 between the dust-receiving opening 35 and the periphery of the saw blade 14, with the line 43 extending along a tangent to the rotation of the saw blade 14 at a location thereon at which the saw blade 14 engages the workpiece 11 (or 11a). In most, if not all, applications of the present invention, the effectiveness of the dust collection system is maximized when the compound miter saw 10 (or other work-performing device) is configured such that the line 43 is along a tangent to the rotation of the saw blade 14 (or other cutting tool) at a location 45 at which the saw blade 14 (or other cutting tool) exits the workpiece, with such tangent extending generally to the center line 33a of the dust-receiving opening 35, and with such orientation remaining constant regardless of the position of the movable saw blade 14 (or other cutting tool).

By way of such an arrangement, the dust duct 33 (and the dust-receiving opening 35) can be much smaller than would otherwise be required of a stationary dust collection duct in order to accommodate the wide variance of positions and movement of the saw blade 14 (or other cutting tool) in a device such as the compound miter saw 10. In addition, in a vacuum-powered dust extraction application (such as that discussed below in connection with FIG. 8, for example), the dust-conveying kinetic energy provided by such a system can be better concentrated in the area to which dust or chips are propelled by the blade or cutting tool. Still further contributing to the effectiveness of the dust collection system of the present invention is the fact that the position and orientation of the dust duct 33, and thus the dust-receiving opening 35, remains constant relative to the saw blade 14 regardless of the movement or adjusted position of either of the blade guard 16 or the fence assembly 20. Thus the present invention provides a distinct performance advantage over dust collection ducts or openings attached to, or incorporated into, either of these components.

FIGS. 6 and 7 schematically or diagrammatically illustrate a significant feature of the present invention wherein the orientation of the dust receiving opening 35 of the dust duct 33 remains constant relative to the saw blade 14, regardless of the operational configuration in which the compound miter saw 10 is used. In FIG. 6, a miter-cutting operation is diagrammatically illustrated, with exemplary miter-cutting positions of the blade 14, the dust duct 33, and the dust-receiving opening 35 being shown in phantom lines and indicated by reference numerals 14a, 33a, and 35a, respectively. FIG. 7 similarly diagrammatically illustrates exemplary bevel-cutting positions of these components in phantom lines and being indicated by reference numerals 14b, 33b, and 35b, respectively. One skilled in the art will readily appreciate that an exemplary compound cutting operation would involve a combination of these two configurations, as well as readily recognizing that the orientation of the dust-receiving opening 35 and the dust duct 33 remains constant relative to the saw 14 in any of these configurations, and in both a raised, at-rest position and a work-engaging position (as shown with reference to FIGS. 1 and 4). Furthermore, as is shown in FIGS. 1 through 4, for example, the dust duct 33 is separate and independent from the blade guard 16 and is therefore not affected by guard movement or adjustment.

Figure 8:
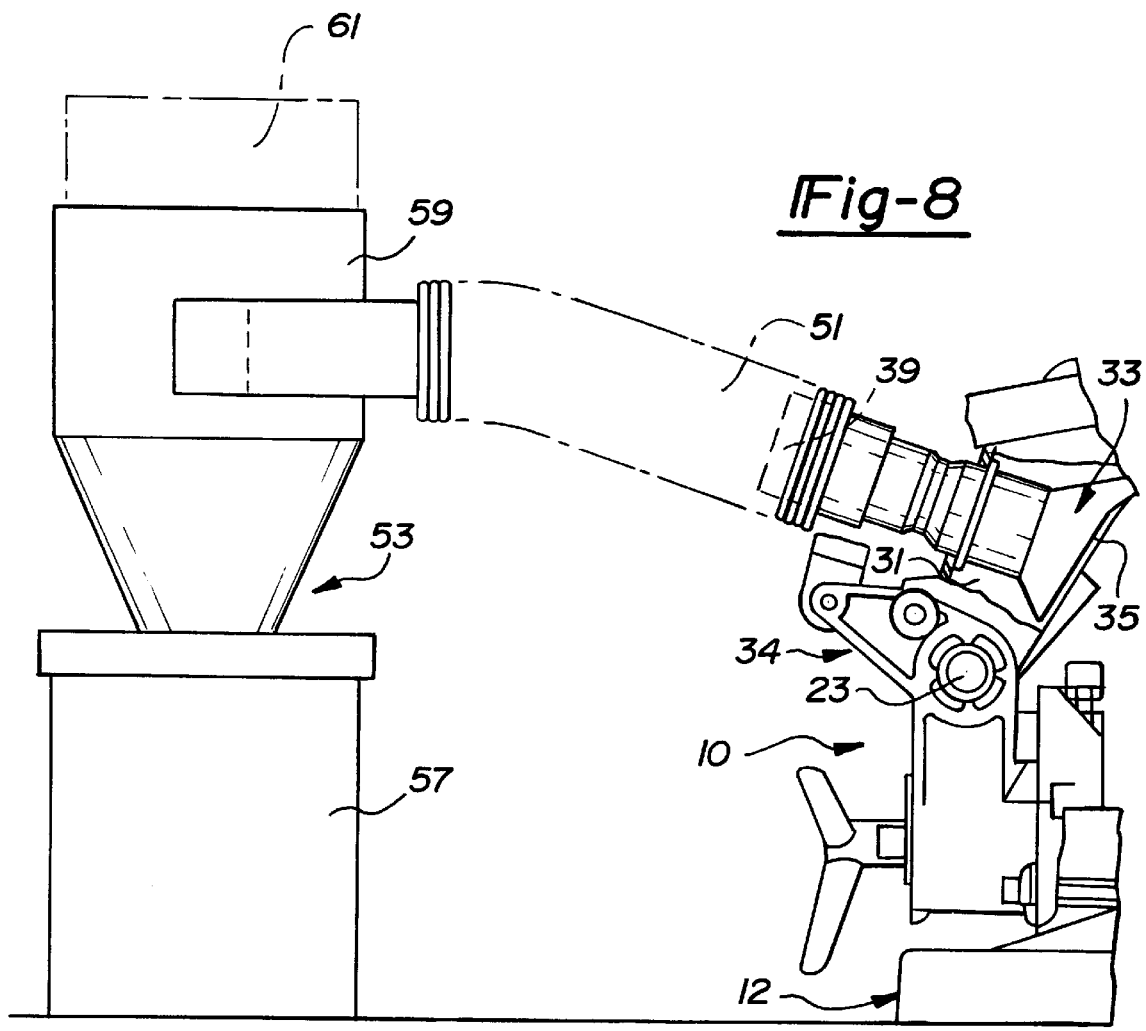
FIG. 8 is an elevational view illustrating the optional inclusion of a dust collection receptacle in the exemplary dust collection system of the present invention.

In FIG. 8, the dust duct 33 is shown with its outlet opening 39 optionally connected, by way of a flexible hose or conduit 51, to an accessory dust collection receptacle assembly 53. The assembly 53 preferably includes a removable collection vessel or bin 57 with a conventional centrifugal separator 59 emptying into the bin 57. As a further option, the assembly 53 can include a powered vacuum-producing fan or blower device 61, shown schematically in FIG. 8 in phantom lines. With such an optional arrangement, either with or without powered vacuum dust-conveying capabilities, the dust extracted and conveyed away from the saw 10 can be contained and collected for convenient disposal. In lieu of the arrangement shown in FIG. 8, however, a conventional dust collection bag accessory 63 can also optionally be provided, as shown schematically in FIG. 4, where greater portability is desired.

Figure 9:
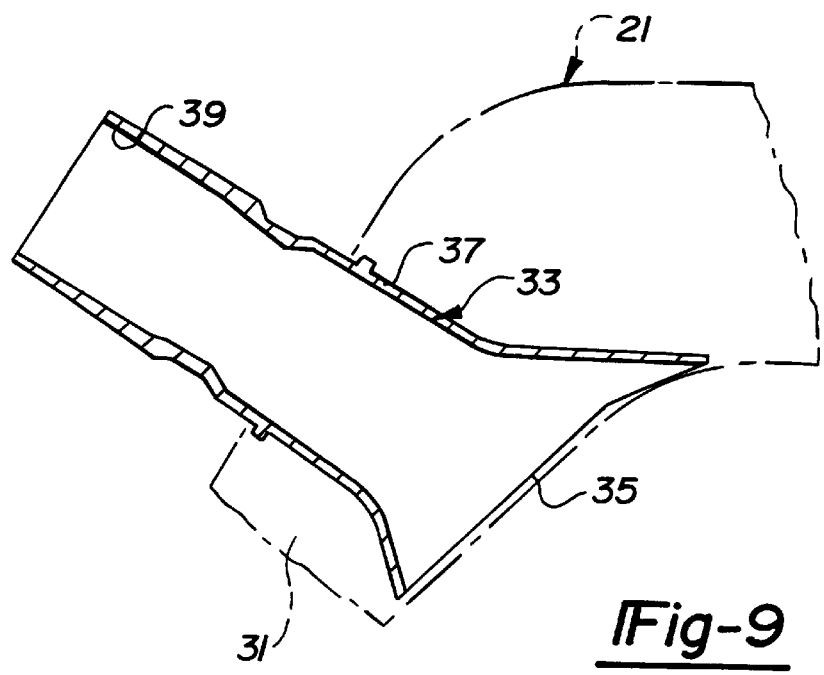
FIG. 9 is a cross-sectional detail view of a preferred dust collection duct according to the invention.
Figure 10:
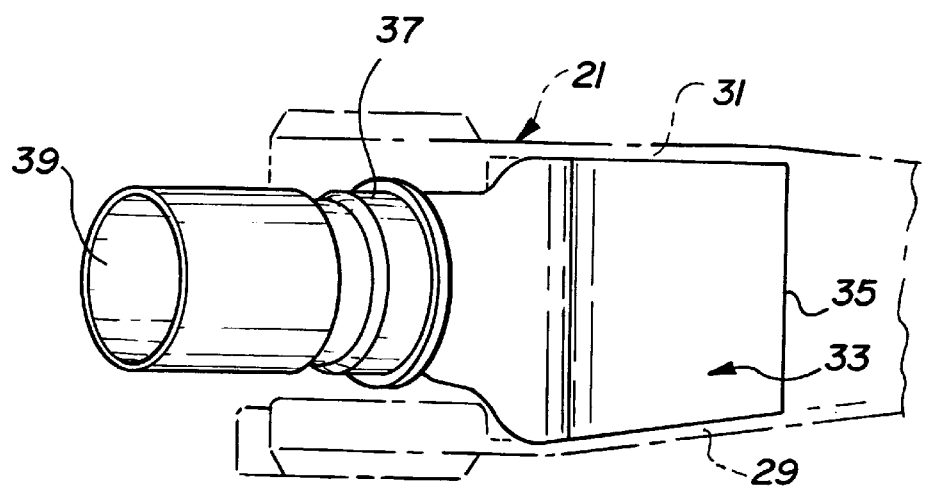
FIG. 10 is a top detail view of a preferred dust collection duct according to the invention.

FIGS. 9 and 10 illustrate an exemplary, generally "funnel-shaped", configuration for the dust duct 33, with a preferred generally rectangular cross-section for the dust-receiving opening 35, and with the transitional intermediate portion 37 converging to a preferred circular outlet opening 39. As shown in FIGS. 4 and 5, for example, an accessory dust deflector or diverter 47, which can be angulated and laterally open along at least a portion of its outer length in order to deflect dust transversely relative to the dust outlet 39, as shown in FIGS. 4 and 5 can be removably and advantageously added to the outlet 39, especially when no accessory collector is used. Such a shape or configuration has been found to be highly effective in dust collection or extraction in experimental prototype versions of the compound miter saw 10. One skilled in the art will readily recognize, however, that variations or modifications on this configuration, including the adding of accessories as discussed above, may be desirable or required in other types of work-performing devices or applications.

Accordingly, the exemplary compound miter saw 10 constructed in accordance with the principles of the present invention, includes a dust collection system that provides for enhanced dust extraction and diversion away from the operator when performing any of the widely divergent cutting operations, in any of the various operational configurations, of which the compound miter saw 10 is capable. Furthermore, it provides such increased effectiveness regardless of the size or shape of the workpiece (within the saw's design parameters) and regardless of the movement or position of the guard or fence. All of such features greatly contribute to the well-being and comfort of the operator, as well as the cleanliness of the work area.

The foregoing discussion discloses and describes merely exemplary embodiments of the present invention for purposes of illustration only. One skilled in the art will readily recognize from such discussion, and from the accompanying drawings and claims, that various changes, modifications, and variations may be made therein without departing from the spirit and scope of the invention as defined in the following claims.

What is claimed is:

1. A work-performing device for performing a work operation on a workpiece, the device comprising:

a workpiece support defining a support surface, said workpiece support including a rotatable table having an axis of rotation;

a fence mounted in a fixed location on said support surface, said fence having a workpiece abutment surface;

a pivot arm;

a rotatable cutting tool mounted on said pivot arm for performing the work operation on the workpiece; and an adjustable guard covering at least a portion of the cutting tool;

wherein the pivot arm is pivotally secured to said workpiece support at a first pivot joint for selective first pivotal movement of the cutting tool toward and away from the workpiece support to move the cutting tool between a non-engagement position spaced away from the workpiece support and a workpiece-engaging position in order to perform the work operation;

and wherein the pivot arm is also pivotally interconnected with the workpiece support at a second pivot joint for selective second pivotal movement about a bevel axis through a plurality of angular orientations relative to the support surface, said first pivotal movement being conducted in any of said angular orientations, the first pivot joint being pivotable about said bevel axis to define a bevel plane, said bevel plane being substantially parallel to and at a fixed non-adjustable distance from said axis of rotation of said rotatable table;

the work-performing device further comprising a dust collection system, said dust collection system comprising:

dust collection means spaced away from the cutting tool and the guard and located at a fixed location relative to the cutting tool, said dust collection means comprising an elongated dust-receiving duct with an inlet thereon for receiving dust during performance of the work operation and an outlet thereon for exhausting dust during performance of the work operation;

said pivot arm comprising a pair of spaced-apart leg portions and said dust-receiving duct positioned in said space between said pivot arm leg portions such that said inlet is located at one side of said pivot arm and said outlet is located at an opposite side of said pivot arm, whereby said dust-receiving duct is movable with the cutting tool to maintain said fixed location relative to the cutting tool, independent of adjustment of the adjustable guard, during any movement of the cutting tool for receiving dust throughout cutting of the workpiece, and said dust-receiving duct having a longitudinal centerline extending through said inlet and said outlet, said dust-receiving duct being oriented relative to the cutting tool such that the centerline extends in generally the same direction as a tangent line of said cutting tool, said tangent line extending between said duct and the cutting tool along a tangent line to a locus of points formed by the rotation of the periphery of the cutting tool, said tangent line originating at about a point of intersection between the locus of points and a portion of a plane defined by said workpiece abutment surface, said portion being contained within peripheral boundaries of said workpiece abutment surface, and said tangent line extending through substantially the center of said inlet;

said orientation of said longitudinal centerline of said dust-receiving duct relative to the cutting tool remaining substantially constant during said first and second pivotal movements.

2. The work-performing device system according to claim 1, wherein said dust-receiving duct is disposed on said pivot arm at a location between said first pivot joint and the rotatable cutting tool.

3. The work performing device according to claim 1, wherein said workpiece support includes means for pivoting said pivot arm for a selective third pivotal movement through a plurality of miter-cutting orientations, and said first and second movements being conducted in any of said miter-cutting orientations, whereby said dust-receiving duct is pivotally movable with said pivot arm for said first, second, and third pivotal movements, said orientation of said inlet relative to the cutting tool remaining substantially constant during said first, second, and third pivotal movements.

4. The work-performing device according to claim 1, wherein said dust collection system further includes a dust conduit in communication with said dust-receiving duct, for conveying dust away from the wrok-performing device.

5. The work-performing device according to claim 4, wherein said dust collection system further includes a dust collection receptacle in communication with a terminal end of said dust conduit for receiving dust therein.

6. The work-performing device according to claim 5, wherein said dust collection system further includes powered vacuum dust conveying means for forcibly conveying dust from said dust-receiving opening to said dust collection receptacle.

7. A sawing apparatus for performing a cutting operation on a workpiece and including a saw and a dust collection system, the saw comprising:

a workpiece support, said workpiece support including a rotatable table having an axis of rotation;

a fence mounted in a fixed location on said workpiece support, said fence having a workpiece abutment surface;

a pivot arm;

a rotatable saw blade operably mounted on said pivot arm; and an adjustable blade guard covering at least a portion of the saw blade;

wherein the pivot arm is pivotally secured to said workpiece support at a first pivot joint for selective first pivotal movement of the saw blade toward and away from the workpiece support to move the saw blade between a non-engagement position spaced away from the workpiece support and a workpiece-engaging position in order to perform the cutting operation;

and wherein the saw is a compound miter saw having said pivot arm also being pivotally interconnected with the workpiece support at a second pivot joint for selective second pivotal movement about a bevel axis through a plurality of angular bevel-cutting orientations, said first pivotal movement being conducted in any of said angular bevel-cutting orientations, said first pivot joint being pivotable about said bevel axis to define a bevel plane, said bevel plane being substantially parallel to and at a fixed non-adjustable distance from said axis of rotation of said rotatable table; and the dust collection system comprising:

dust collection means spaced away from the saw blade and the blade guard and located at a fixed location relative to the saw blade, said dust collection means comprising an elongated dust-receiving duct with an inlet thereon for receiving dust during the performance of the cutting operation and with a dust outlet thereon for exhausting dust during performance of the cutting operation;

said pivot arm comprising a pair of spaced-apart leg portions and said dust-receiving duct positioned in said space between said pivot arm leg portions such that said inlet is located at one side of said pivot arm and said outlet is located at an opposite side of said pivot arm, whereby said dust-receiving duct is movable with the saw blade to maintain said fixed location relative to the saw blade, independent of adjustment of the adjustable guard, during movement of the saw blade for receiving dust throughout cutting of the workpiece, and said dust-receiving duct having a longitudinal centerline extending through said inlet and said outlet, said dust-receiving duct being oriented relative to the saw blade such that the centerline extends in generally the same direction as a tangent line of said saw blade, said tangent line extending between said duct and the saw blade along a tangent to a locus of points formed by the rotation of the periphery of the saw blade, said tangent line originating at about a point of intersection between the locus of points and a portion of a plane defined by the workpiece abutment surface, said portion being contained within peripheral boundaries of said workpiece abutment surface, and said tangent line extending through substantially the center of said inlet;

the workpiece support including means for pivoting said pivot arm for a selective third pivotal movement through a plurality of angular miter-cutting orientations, and said first and second pivotal movements being conducted in any of said angular miter-cutting orientations, said fixed location of said dust-receiving duct relative to the saw blade remaining substantially constant during any of said first, second and third pivotal movements.

8. The sawing apparatus according to claim 7, wherein said dust-receiving duct is disposed on said pivot arm at a location between said first pivot joint and the saw blade.

9. The sawing apparatus according to claim 7, wherein said dust collection system further includes a dust conduit in communication with said dust-receiving duct for conveying dust away from the saw.

10. The sawing apparatus according to claim 9, wherein said dust collection system further includes a dust collection receptacle in communication with a terminal end of said dust conduit for receiving dust therein.

11. The sawing apparatus according to claim 10, wherein said dust collection system further includes powered vacuum dust conveying means for forcibly conveying dust from said dust-receiving duct to said dust collection receptacle.

12. The sawing apparatus according to claim 11, wherein said dust-receiving duct is generally funnel-shaped in configuration, said inlet having a larger opening than that of said dust outlet.

13. The sawing apparatus according to claim 12, wherein said inlet is generally rectangular in shape.

14. A work-performing device for performing a work operation on a workpiece, the work-performing device comprising:

a workpiece support, said workpiece support including a rotatable table having an axis of rotation;

a fence mounted in a fixed location on said workpiece support, said fence having a workpiece abutment surface;

a pivot arm;

a rotatable cutting tool mounted on said pivot arm for performing the work operation on the workpiece; and an adjustable guard covering at least a portion of said cutting tool;

wherein the pivot arm is pivotally secured to said workpiece support at a first pivot joint for selective first pivotal movement of the cutting tool toward and away from the workpiece support to move the cutting tool between a non-engagement position spaced away from the workpiece support and a workpiece-engaging position in order to perform the work operation;

and wherein said pivot arm is also pivotally interconnected with the workpiece support at a second pivot joint for selective second pivotal movement about a bevel axis through a plurality of angular orientations relative to the workpiece support, said first pivotal movement being conducted in any of said angular orientations, said first pivot joint being pivotable about said bevel axis to define a bevel plane, said bevel plane being substantially parallel to and at a fixed non-adjustable distance from said axis of rotation of said rotatable table;

the work-performing device further comprising a dust collection system, said dust collection system comprising:

a dust collection device spaced away from the cutting tool and the guard and located at a fixed location relative to the cutting tool, said dust collection device comprising an elongated dust-receiving duct with an inlet thereon for receiving dust during performance of the work operation and with a dust outlet thereon for exhausting dust during performance of the work operation;

said pivot arm comprising a pair of spaced-apart leg portions and said dust-receiving duct positioned in said space between said pivot arm leg portions such that said inlet is located at one side of said pivot arm and said outlet is located at an opposite side of said pivot arm, whereby said dust-receiving duct is movable with the cutting tool to maintain said fixed location relative to the cutting tool, independent of adjustment of the adjustable guard, during movement of the cutting tool for receiving dust throughout cutting of the workpiece, and said dust-receiving duct having a longitudinal centerline extending through said inlet and said outlet, said dust-receiving duct being oriented relative to the cutting tool such that the centerline extends in generally the same direction as a tangent line of said cutting tool, said tangent line extending between said duct and the cutting tool along a tangent line to a locus of points formed by the rotation of the periphery of the cutting tool, said tangent line originating at about a point of intersection between the locus of points and a portion of a plane defined by said workpiece abutment surface, said portion being contained within peripheral boundaries of said workpiece abutment surface, and said tangent line extending through substantially the center of said inlet;

said orientation of said dust-receiving duct relative to the cutting tool remaining substantially constant during said first and second pivotal movements.

15. The work-performing device according to claim 14, wherein said dust-receiving duct is disposed on said pivot arm at a location between said first pivot joint and the rotatable cutting tool.

16. The work performing device according to claim 14, wherein said workpiece support includes means for pivoting said pivot arm for a selective third pivotal movement through a plurality of miter-cutting orientations, and said first and second movements being conducted in any of said miter-cutting orientations, whereby said dust-receiving duct is pivotally movable with said pivot arm for said first, second, and third pivotal movements, said orientation of said centerline relative to the cutting tool remaining substantially constant during said first, second, and third pivotal movements.

17. A sawing apparatus for performing a cutting operation on a workpiece and including a saw and a dust collection system, the saw comprising:

a workpiece support, said workpiece support including a rotatable table having an axis of rotation;

a fence mounted in a fixed location on said workpiece support, said fence having a workpiece abutment surface;

a pivot arm;

a rotatable saw blade operably mounted on said pivot arm; and an adjustable blade guard covering at least a portion of the saw blade;

wherein said pivot arm is pivotally secured to said workpiece support at a first pivot joint for selective first pivotal movement of the saw blade toward and away from the workpiece support to move the saw blade between a non-engagement position spaced away from the workpiece support and a workpiece-engaging position in order to perform the cutting operation;

and wherein the saw is a compound miter saw having said pivot arm also being pivotally interconnected with the workpiece support at a second pivot joint for selective second pivotal movement about a bevel axis through a plurality of angular bevel-cutting orientations, said first pivotal movement being conducted in any of said angular bevel-cutting orientations, said first pivot joint being pivotable about said bevel axis to define a bevel plane, said bevel plane being substantially parallel to and at a fixed non-adjustable distance from said axis of rotation of said rotatable table; and the dust collection system comprising:

a dust collection device spaced away from the saw blade and the blade guard and located at a fixed location relative to the saw blade, said dust collection device comprising an elongated dust-receiving duct with an inlet thereon for receiving dust during the performance of the cutting operation and with an outlet thereon for exhausting dust during performance of the cutting operation;

said pivot arm comprising a pair of spaced-apart leg portions and said dust-receiving duct positioned in said space between said pivot arm leg portions such that said inlet is located at one side of said pivot arm and said outlet is located at an opposite side of said pivot arm, whereby said dust-receiving duct is movable with the saw blade to maintain said fixed location relative to the saw blade, independent of adjustment of the adjustable guard, during movement of the saw blade for receiving dust throughout cutting of the workpiece, and said duct-receiving duct having a longitudinal centerline extending from said inlet through said outlet, said dust-receiving duct being oriented relative to the saw blade such that the centerline extends in generally the same direction as a tangent line of said saw blade, said tangent line extending between said duct and the saw blade along a tangent to a locus of points formed by the rotation of the periphery of the saw blade, said tangent line originating at about a point of intersection between the locus of points and a portion of a plane defined by the workpiece abutment surface, said portion being contained within peripheral boundaries of said workpiece abutment surface, and said tangent line extending through substantially the center of said inlet for directly receiving saw dust into said dust-receiving duct when the cutting tool is in the workpiece-cutting position;

the workpiece support including means for pivoting said pivot arm for a selective third pivotal movement through a plurality of angular miter-cutting orientations, and said first and second pivotal movements being conducted in any of said angular miter-cutting orientations, said orientation of said dust-receiving duct relative to the saw blade remaining substantially constant during any of said first, second, and third pivotal movements.

18. The sawing apparatus according to claim 17, wherein said dust collection system further includes a dust conduit in communication with said dust-receiving duct for conveying dust away from the saw.

19. The sawing apparatus according to claim 18, wherein said dust collection system further includes a dust collection receptacle in communication with a terminal end of said dust conduit for receiving dust therein.

20. The sawing apparatus according to claim 19, wherein said dust collection system further includes powered vacuum dust conveying device for forcibly conveying dust from said dust-receiving duct to said dust collection receptacle.

21. The sawing apparatus according to claim 20, wherein said dust-receiving duct is generally funnel-shaped in configuration, said inlet having a larger opening than that of said dust outlet.

22. The sawing apparatus according to claim 21, wherein said inlet is generally rectangular in shape.

* * * * *